United States Patent
Weinstein

[15] 3,680,702
[45] Aug. 1, 1972

[54] FILTER CLEANING SYSTEM
[72] Inventor: Seymour Weinstein, 1012 Dobson, Evanston, Ill. 60202
[22] Filed: Nov. 9, 1970
[21] Appl. No.: 87,841

[52] U.S. Cl..................................210/81, 210/334
[51] Int. Cl.........................B01d 29/38, B01d 29/34
[58] Field of Search........................210/81, 332, 334

[56] References Cited

UNITED STATES PATENTS

| | | |
|---|---|---|
| 3,240,338 | 3/1966 | Schmidt et al. ...........210/334 X |
| 1,502,700 | 7/1924 | Usllez.........................210/334 |
| 3,252,577 | 5/1966 | Anderson...................210/334 X |

Primary Examiner—Frank A. Spear, Jr.
Attorney—Lettvin and Gerstman

[57] ABSTRACT

Pressure leaf filter apparatus having parallel vertically arranged filters with sluicing pipes on opposite sides of the filter for directing a high pressure spray of sluice liquid against the suspended solids cake formed on each filter. The sluicing pipes are pivoted with butterfly-type synchronized oscillation to provide an undercutting action on the cake as both pipes move upwardly.

5 Claims, 2 Drawing Figures

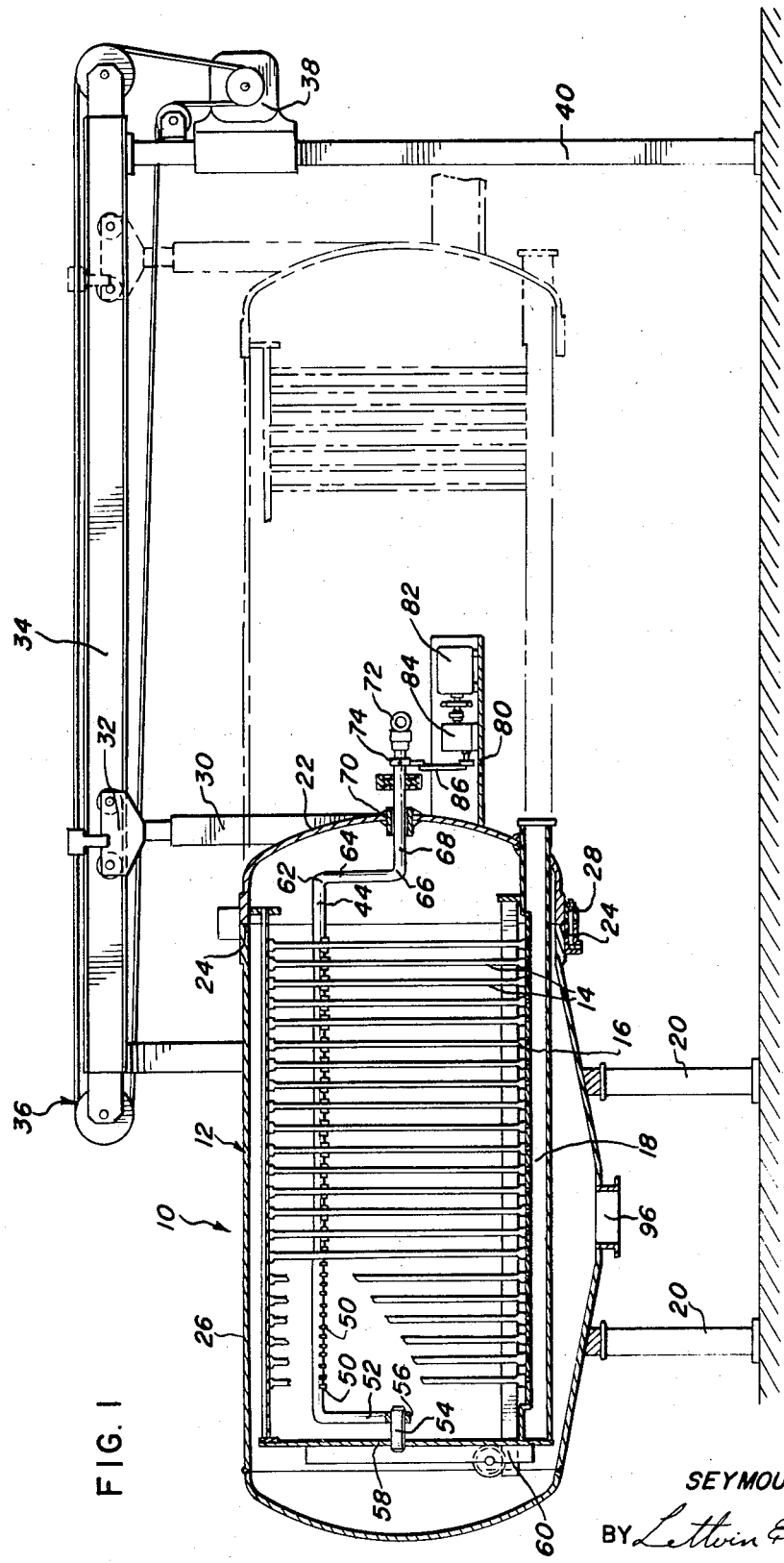

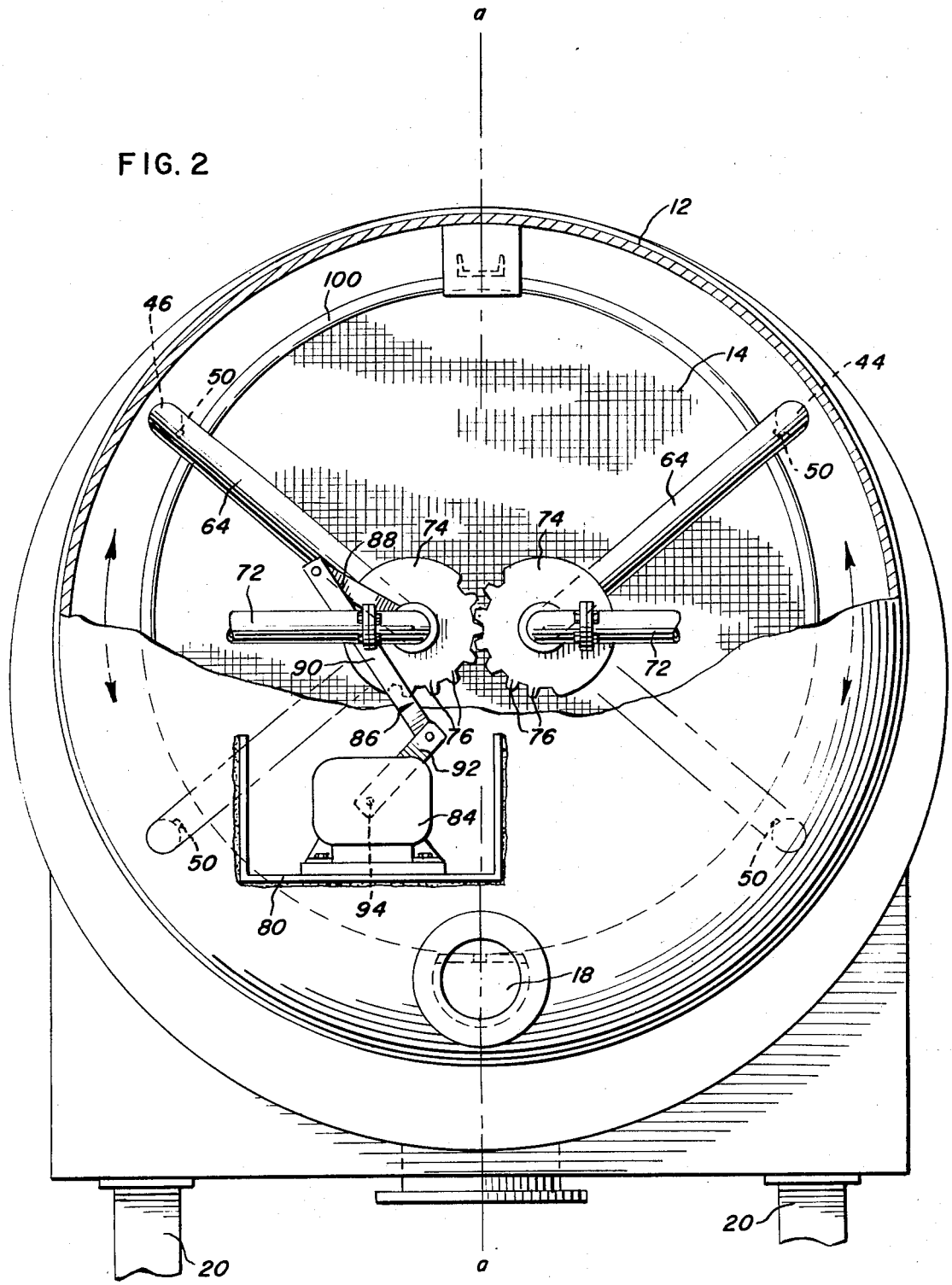

FILTER CLEANING SYSTEM

BACKGROUND OF THE INVENTION

This invention relates to a novel system for removing the suspended solids cake from the filters of pressure leaf filter apparatus.

Pressure leaf filters are commonly used to remove suspended solids from a liquid. In conventional apparatus, a number of parallel vertically arranged filter leaves are located within a tank through which the unfiltered liquid is introduced under pressure. The suspended solids will remain on the filters as a cake, while the filtrate flows through the drainage mesh of each filter to the circumferential hollow binding at the circumference of each filter. The filtrate is drained through nozzles to a manifold and therefrom to suitable storage facilities.

In order to clean the filter leaves (i.e. remove the suspended solids cake therefrom) it is conventional to provide a high pressure spray of sluice liquid directed against each filter leaf. Sluicing is accomplished when the cake is a certain thickness and after the unfiltered liquid is removed. Prior art systems have employed overhead sluicing pipes which direct sluice liquid downwardly against the filter leaves. Other prior art systems have employed a pair of sluicing pipes each of which is located on opposite sides of the filter leaves. The sluicing pipes are connected so that when one of them moves downwardly the other moves upwardly. Although the latter arrangement has been found satisfactory for many purposes, I have discovered that a more effective cleaning action is obtained by providing sluicing pipes on opposite sides of the filter leaves, with the sluicing pipes moving in butterfly-type oscillation and synchronism. As used herein, "butterfly-type oscillation" represents the type of movement of a butterfly wing, that is, with both sluicing pipes moving in synchronism upwardly together and both sluicing pipes moving in synchronism downwardly together.

I have found that by using butterfly-type synchronized oscillation and by introducing a high pressure spray of sluice liquid against the cake formed on each filter during such oscillation, the sluicing action will provide an undercutting action on the cake as both sluicing pipes move upwardly in synchronism, to thereby weaken the cake so that it will fall when the pipes have moved to their upper position. In this manner, a more effective cleaning action than is provided in the prior art is thereby accomplished.

It is, therefore, an object of the present invention to provide a system for removing the suspending solids cake formed on the filters of a pressure leaf filter apparatus by moving oppositely positioned sluicing pipes in butterfly-type oscillation and synchronism.

Other objects and advantages of the present invention will become apparent from the following description and claims, which describe the invention that is illustrated in the accompanying drawings.

BRIEF DESCRIPTION OF THE DRAWINGS

FIG. 1 is a side elevational view of a pressure leaf filter apparatus in accordance with the principles of the present invention, with the tank taken in cross-section and showing, in phantom lines, the leaf assembly removed from the housing for removal of the sludge; and FIG. 2 is an enlarged end view thereof, taken from the right side of the apparatus of FIG. 1 and with some portions broken away and some portions shown in cross-section for illustrative purposes.

DETAILED DESCRIPTION OF THE ILLUSTRATIVE EMBODIMENT

Referring to the drawing, reference numeral 10 refers to the pressure leaf filter apparatus forming the illustrative embodiment of the present invention, which comprises a liquid-tight tank 12 enclosing a number of conventional pressure filter leaves 14. The filter leaves 14 are connected in the conventional manner to nozzles 16 which communicate with filtrate manifold 18, as is all well known in the art. The bottom of tank 12 is supported by uprights 20 and the tank has a removable front portion 22 which disengages at 24 from the main portion 26 of the tank assembly.

The filter leaves 14, nozzles 16 and manifold 18 are connected to the front portion 22 and are removed as indicated in phantom in FIG. 1, by simply loosening the bolts 28 which clamp front portion 22 to main portion 26. Front portion 22 is connected by carriage strut 30 and carriage trolley 32 to a monorail 34 having a chain and pulley drive 36 operated by electrical motor 38 carried by strut 40, to move the filter leaf assembly from the main portion 26 as indicated in FIG. 1. Such basic construction of a horizontal style pressure leaf filter apparatus is known in the art and typical examples are manufactured by the Industrial Filter & Pump Mfg. Co., Cicero, Illinois and by the Enzinger division of Duriron Company, Angola, New York.

As an improvement with respect to the conventional horizontal type pressure leaf filter apparatus that is well known in the art, I have discovered that a very effective removal of the suspended solids cake formed on the filters 14 during the filtering process can be accomplished using sluicing headers or pipes 44, 46 having a butterfly-type oscillation. In accordance with my invention, the main portions of sluicing headers 44, 46 extend horizontally and each is disposed on an opposite side of an imaginary vertical plane $a$—$a$ (FIG. 2) which extends perpendicular to the planes of the filters and bisects the filters. The headers 44, 46 each include a number of nozzles 50 which are directed towards the filters and from which a high pressure spray exits when the sluicing liquid is introduced to the headers. Referring to FIG. 1, the back end 52 of each of the headers is rotatable on a separate shaft 54 via a suitable bearing or bushing 56. For convenience of illustration only one of the headers and one shaft is shown in FIG. 1. It is understood that the other header and shaft are symmetrically positioned as indicated in FIG. 2. Shaft 54 is fastened to backplate 58 which is connected to the leaf filter assembly and moves with the assembly as the assembly is slid along the track 60 when detached from main portion 26.

Each of the headers has a right angle bend at 62 and a portion 64 which extends perpendicularly to the main portion of the header, a further right angle bend 66 and a front portion 68 which extends in offset parallel relationship to the main portion of the header and through the front portion 22 of the tank. Portion 68 is pivotable within a liquid-tight bearing member 70 and communicates with the sluice liquid inlet pipe 72.

A toothed gear 74 is keyed to each of portions 68, in order to provide synchronized pivotable movement of the sluicing headers. Referring to FIG. 2 in particular, it can be seen that the teeth 76 of gears 74 mesh so that when one of the gears 74 is driven to pivot, the other gear 74 will move therewith to cause the headers to move in synchronized butterfly-type oscillation.

A motor stand 80 is fastened to front portion 22 for carrying a motor 82 which, through a gear box 84, drives crank mechanism 86. As shown most clearly in FIG. 2, crank mechanism 86 includes a driven arm 88 keyed to gear 74 for moving that gear, a connecting arm 90 pivotably connected to arm 88 and a driving arm 92 pivotably connected to arm 90 and keyed to output shaft 94 of gear box 84. It can be seen that clockwise movement of shaft 94 (with respect to FIG. 2) will cause the crank mechanism 86 to pivot gears 74 both clockwise and counterclockwise thereby providing butterfly-type oscillation for the sluicing headers.

The butterfly-type oscillation provides efficient removal of the suspended solids cake because, with the nozzles substantially aligned with the plane of each filter, when the headers are in their lowermost position and begin to move upwardly, the sluicing spray will tend to undercut the cake. This undercutting action will greatly loosen the cake at the lower portions thereof, and when the headers have moved past the 3 o'clock and 9 o'clock positions toward their uppermost position, the loosened lower portion of the cake will enable the upper portion which is now being sprayed to fall. The synchronized movement of the sluicing headers, whereby the headers work together to apply a pressurized sluicing spray to the filters, optimizes removal of the cake in the aforesaid manner.

In the operation of the system, the unfiltered liquid is fed under pressure to the tank via combination inlet-outlet 96. A suspended solids cake will form on the filters while the filtrate flows through the drainage mesh of the filter to the circumferential hollow binding 100 of each filter, through the nozzles 16 to manifold 18 and therefrom to suitable storage facilities, all in the manner well recognized by those skilled in the art.

When the cake has reached a predetermined thickness on the filter, for example ¾ to 1½ inches, the filtering process is so inefficient that it is necessary to remove the cake in order to continue efficient filtering. Thereupon, the unfiltered liquid is removed via drain 96 and conventional sluicing liquid is forced into pipes 72, through sluicing headers 44, 64 and out of nozzles 50. During the sluicing, motor 82 is energized to cause synchronized butterfly-type oscillation of the headers, whereby the cake will be removed in the manner described above. When the cake is removed, the system is then again drained via drain 96 and bolts 28 can be loosened to disconnect front portion 22 from the main portion 26 of the tank. Motor 38 can be energized to remove the filter leaf assembly for inspection from time to time. The assembly can then be returned to the main tank portion, bolts 28 can be tightened and the unfiltered liquid can then again be pumped into the apparatus via inlet 96 to continue the filtering process.

It is seen that a novel system for removing the suspended solids cake formed in the filters of pressure leaf filter apparatus has been described, in which sluicing pipes are provided on opposite sides of the filters and are moved in synchronized butterfly-type oscillation. Other modifications and substitutions become apparent from this disclosure. For example, each sluicing header could have its own rotational drive, with one of the motors being positioned on the front side of the apparatus and the other motor positioned on the backside thereof. Additionally, the nozzles may take various shapes and directions in order to direct the spray in a selective manner. It is to be understood that such modifications or substitutions which become apparent by those skilled in the art fall within the spirit and scope of the present invention.

What is claimed is:

1. In a pressure leaf filter apparatus having a number of parallel vertically arranged filters within a tank, which filters retain suspended solids from a liquid thereby forming a cake on the filters, a sluicing device for removing the cake from the filters, the improvement comprising, in combination: the sluicing device including a pair of sluicing headers the main portion of each of which extends horizontally and each of which is disposed on opposite sides of a vertical plane which extends perpendicular to the planes of the filters and bisects the filters, said headers each including a plurality of nozzles directed toward the filters, and means for pivoting the headers about a horizontal axis that extends through the filters, said pivot means comprising means for providing synchronized butterfly-type oscillation of said sluicing headers whereby they will move in synchronism while being disposed at equal angles with respect to said vertical plane, said butterfly-type oscillation providing an undercutting action on the cakes as both headers move upwardly in synchronism to thereby weaken the cakes so that they will fall when the headers move in the direction toward their uppermost position.

2. Apparatus as described in claim 1 in which said means for providing synchronized movement comprises a pair of meshed gears each of which is fastened to a different one of the headers, said pivot means comprising motor driven means fastened to one of said meshed gears.

3. A method of removing the suspended solids cake formed on the filters of pressure leaf filter apparatus comprising the steps of: removing from the apparatus the unfiltered liquid, providing sluicing pipes on opposite sides of the filters, and moving the sluicing pipes in butterfly-type oscillation and synchronism, to introduce a high pressure spray of sluice liquid against the cake formed on each filter and provide an undercutting action on the cake as both sluicing pipes move upwardly in synchronism to thereby weaken the cakes so that they fall when the pipes move in the directions toward their uppermost positions.

4. In a sluicing apparatus for removing solids from leaf filters that are arranged in parallel spaced upright relationship to lie transverse to the longitudinal axis of an elongated tank through which liquid is being pumped under pressure, the improvement in such sluicing apparatus comprising, in combination: a pair of elongated liquid-carrying headers extending parallel to the longitudinal axis of said tank, nozzles operatively associated with each header for directing sluicing liquid as desired toward the filter leaves, and means for providing synchronized butterfly-type oscillation of said headers whereby they will move in synchronism while being disposed at equal angles with respect to a vertical plane that intersects the said filter leaves.

5. Apparatus of claim 4 wherein the headers are arranged to move outwardly and upwardly to provide an undercutting action on the cakes of solids as both headers move upwardly in synchronism, to thereby weaken said cakes of solids so that they will fall as the headers move in the directions toward their uppermost positions.

* * * * *